US00RE40562E

(19) United States
(12) Reissued Patent
Naugler et al.

(10) Patent Number: US RE40,562 E
(45) Date of Reissued Patent: Nov. 4, 2008

(54) RETRACTABLE TELESCOPING FIRE SPRINKLER

(76) Inventors: Theodore P. Naugler, 32 Bailey La., West Newbury, MA (US) 01985; Eric P. Stucker, 5 Lynne Ave., Salisbury, MA (US) 01952; Robert C. Naugler, 5 Perry Way, Newburyport, MA (US) 01950; C. Daniel Swift, 5 Perry Way, Unit 2, Newburyport, MA (US) 01950

(21) Appl. No.: 11/589,148

(22) Filed: Oct. 27, 2006

Related U.S. Patent Documents

Reissue of:
(64) Patent No.: 6,808,128
Issued: Oct. 26, 2004
Appl. No.: 10/216,650
Filed: Aug. 9, 2002

(51) Int. Cl.
*B05B 15/10* (2006.01)
*B05B 15/06* (2006.01)
*A62C 31/02* (2006.01)
*A62C 31/28* (2006.01)

(52) U.S. Cl. ..... 239/209; 239/204; 239/205; 239/282; 239/283; 239/571; 239/587.1; 251/54; 169/37

(58) Field of Classification Search ..... 239/209, 239/205, 282, 283, 571, 587.1, 200, 201, 239/204, 208, 280, 280.5, 281, 452, 453, 239/456, 459, 532, 570; 169/37, 7, 8, 16, 169/17, 20, 56; 251/54, 48
See application file for complete search history.

(56) References Cited

U.S. PATENT DOCUMENTS 2,325,280 A * 7/1943 Scherrer ..... 239/204
2,360,203 A * 10/1944 Cox ..... 239/204
2,573,786 A * 11/1951 Brodbeek et al. ..... 239/251
2,879,946 A * 3/1959 Stipek ..... 239/204
2,912,111 A * 11/1959 Kovac, Jr. ..... 210/119
3,067,823 A * 12/1962 Kavanaugh ..... 169/41
3,118,609 A * 1/1964 Glover ..... 239/205
3,402,967 A * 9/1968 Edmonds et al. ..... 299/5
3,584,689 A * 6/1971 Willms ..... 169/17
3,589,616 A * 6/1971 Stephens ..... 239/204
3,848,675 A * 11/1974 Evans ..... 169/15
4,007,877 A * 2/1977 Jackson et al. ..... 239/209
4,010,901 A * 3/1977 Sheets ..... 239/204
4,083,410 A * 4/1978 Anderson ..... 169/37
4,139,062 A * 2/1979 Rago ..... 169/37
4,228,858 A * 10/1980 Sclafani ..... 169/41
4,254,913 A * 3/1981 Georgiev et al. ..... 239/204
4,272,023 A * 6/1981 Georgiev et al. ..... 239/204
4,479,611 A * 10/1984 Galvis ..... 239/205
4,749,127 A * 6/1988 Ash ..... 239/14.2
4,792,095 A * 12/1988 Pristo et al. ..... 239/204
5,020,722 A * 6/1991 Wardell
5,160,174 A * 11/1992 Thompson ..... 285/32
5,823,439 A * 10/1998 Hunter et al. ..... 239/505
5,918,812 A * 7/1999 Beutler ..... 239/205
5,921,322 A * 7/1999 Bonfield et al. ..... 169/37
6,216,963 B1 * 4/2001 Bonfield et al. ..... 239/204

FOREIGN PATENT DOCUMENTS

CA 1258277 * 8/1989
DE 3713507 * 10/1987
DE 4129888 * 3/1993
EP 0185901 * 7/1986
EP 0536740 * 4/1993

* cited by examiner

*Primary Examiner*—Darren W Gorman
(74) *Attorney, Agent, or Firm*—Greenberg Traurig, LLP

(57) ABSTRACT

A retracting telescoping automatic fire sprinkler is disclosed. In a dry system, the sprinkler extends to its operating position under system pressure that is applied in response to a preaction signal. When system pressure is removed, as in after a test is completed, the sprinkler automatically retracts to its original position.

30 Claims, 6 Drawing Sheets

RETRACTABLE TELESCOPING FIRE SPRINKLER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to pre-acting retractable extending fire sprinklers.

2. Background Information

Fire protection sprinklers may be operated individually, e.g. by a self-contained thermally sensitive element, or as part of a deluge system in which fire retardant fluid flows through a number of open sprinklers, essentially simultaneously. Fire retardant fluids may include natural water or appropriate mixtures of natural water and one or more additives to enhance fire-fighting properties of a fire protection system.

Fire protection sprinklers generally include a body with an outlet, an inlet connectable to a source of fire retardant fluid under pressure, and a deflector supported by the body in a position opposing the outlet for distribution of the fire retardant fluid over a predetermined area to be protected from fire. Individual fire protection sprinklers may be automatically or non-automatically operating. In the case of automatically operating fire protection sprinklers, the outlet is typically secured in the normally closed or sealed position by a cap. The cap is held in place by a thermally-sensitive element which is released when its temperature is elevated to within a prescribed range, e.g. by the heat from a fire. In some cases, sprinklers are not permanently positioned in their spraying position, but are installed above or behind a cover that conceals the sprinkler for aesthetic reasons, or to prevent the sprinkler from interfering with the function of the chamber such as in an anechoic chamber. In such cases, the sprinkler is retracted from its spraying position when not in use, and telescopes to its spraying position either automatically or as directed by a control system.

Telescoping pipes have been used in fire sprinkler systems. U.S. Pat. No. 5,160,174 to Thompson shows telescoping pipes and applications for such pipes in fire sprinkler systems.

U.S. Pat. Nos. 5,921,322 and 6,216,963 relate to a hydraulic device for regulating the speed of deployment of sprinkler heads in preactive sprinkler systems. These prior art sprinklers do not disclose a mechanism to retract the sprinkler head. In the prior art systems, a sprinkler head is installed at one end of an inner conduit. The inner conduit fits inside an outer conduit as a position fits in a cylinder. There is an annular space between the inner and outer conduits. This annular space is bounded by slidable seals at each end. When a high-pressure fluid is applied to the inner conduit, the piston telescopes out of the outer conduit compressing the annular space between the cylinders. The prior art teaches that the fluid in the annular space is released either into the fire extinguishing media, to the outside of the outer conduit through a series of bleeder holes that can be varied in size to control the rate of travel of the piston.

Telescoping and retracting sprinkler systems have been used in irrigation systems. For example, U.S. Pat. No. 4,254,913 to Georgicv shows a retractable spray head for an irrigation system. U.S. Pat. No. 4,749,127 shows telescoping snow making apparatus that includes a telescoping and retracting spray head.

These applications do not show a retracting telescoping fire sprinkler.

SUMMARY OF THE INVENTION

A retractable telescoping sprinkler is disclosed. Some advantages of the retractable telescoping sprinkler include the ability to control the rate of deployment of a telescoping sprinkler, and its ability to retract to its undeployed position. The sprinkler can deploy and retract without draining fire-extinguishing media from the sprinkler head.

The sprinkler includes means for regulating the speed of deployment of the sprinkler head from the retracted position to the extended position and means for retracting the telescoped sprinkler head back to a retracted position.

The sprinkler may be mounted in any orientation convenient to the installation. The sprinkler may deploy vertically coming down from a recess in a ceiling, horizontally projecting from a wall, or at any angle from an oblique surface as required by the details of the installation. Any sprinkler head providing a desired distribution pattern and coverage may be used.

In one illustrative embodiment, the sprinkler includes an outer conduit and an inner conduit. The two conduits are sized such that the inner conduit can slide into the outer conduit and define a space between the conduits. If both conduits are round tubes, as may be convenient, the space will be annular. However, the conduits are not limited to round tubes, but can be any shape that has adequate strength, heat tolerance, and flow capacity to meet the requirements of the installation. The conduits have stops at their ends that limit the motion of the inner conduit such that the inner conduit will not slide out from the outer conduit when the inner conduit extends. Bearings may be positioned to guide or support the inner conduit as it extends and retracts in operation.

Fluid seals are positioned between the inner conduit and the outer conduit. These seals slidably engage the walls of the conduit so that they longitudinally compress the annular space between the conduits when the telescoping sprinkler extends. Additionally, when the telescoping sprinkler retracts, the seals longitudinally extend the annular space between the conduits.

A flow control valve can be connected to an outlet from the annular space near the point where the inner conduit extends from the outer conduit. When the sprinkler extends, the space between the conduits is compressed longitudinally, the valve allows fluid to flow from the space at a predetermined rate. The rate can be viewed as desired to allow for faster or slower deployment, or for operation with different size conditions. The fluid can be any suitable fluid, either gaseous or liquid. The fluid may be a mixture of two or more liquids to obtain a desired flow profile.

The flow control valve is also fluidly connected to a reservoir or expansion tank. When fluid is pressed out of the space between the conduits, the fluid flows into the reservoir. When the sprinkler retracts, the fluid flows from the reservoir to through the flow control valve into the space between the conduits. Optionally, pressure may be applied to the reservoir to assist in retracting the sprinkler.

One or more springs may be mechanically connected to the outer conduit and the distal end of the inner conduit. The springs maintain tension holding and telescoping sprinkler in the retracted position until the sprinkler is deployed.

When the sprinkler is deployed, fire-extinguishing agent is supplied under pressure to the conduits. The pressure of the fire-extinguishing agent applies a force to extend the telescoping sprinkler. This pressure pushes the inner conduit to the extended position. This extension compresses the space between the conduits and forces fluid through the flow control valve into the reservoir. Additionally, the springs are extended under tension.

When the pressure of the fire-extinguishing agent is removed, the springs retract. The inner conduit slides back into the nested position within the outer conduit. The sealing means slide along the walls of the conduits expanding the volume of the space between the conduits. Fluid flows from the reservoir through the control valve back into the space between the conduits. This fluid return may be assisted by application of pressure to the reservoirs containing the fluid.

BRIEF DESCRIPTION OF THE DRAWINGS

The invention description below refers to the accompanying drawings, of which.

DETAILED DESCRIPTION OF AN ILLUSTRATIVE EMBODIMENT

A retractable telescoping sprinkler is disclosed. While the sprinkler can be used in any system, the retractable telescoping sprinkler is advantageously used in a dry, preacting sprinkler system. In such a system, the sprinklers are not under pressure, or may be under reduced pressure. In operation, a control systems responding to a sensor detects a condition that requires that the sprinklers be pressurized opens a valve to allow fire extinguishing media—to flow into the sprinklers. Alternatively, if the system has been maintained at some pressure, a sprinkler head may be activated and the control system will deploy the sprinklers in response to the pressure drop. In some cases, the sprinkler heads are open, and fire-extinguishing media can flow from the open heads when the control valve is opened. In other systems, each sprinkler is closed with a thermally sensitive valve. In such a case, the control system will supply fire-extinguishing medium to the sprinkler head under pressure as directed by the control system, but each individual sprinkler will open only in response to heat applied to the sprinkler head.

Figure 1:
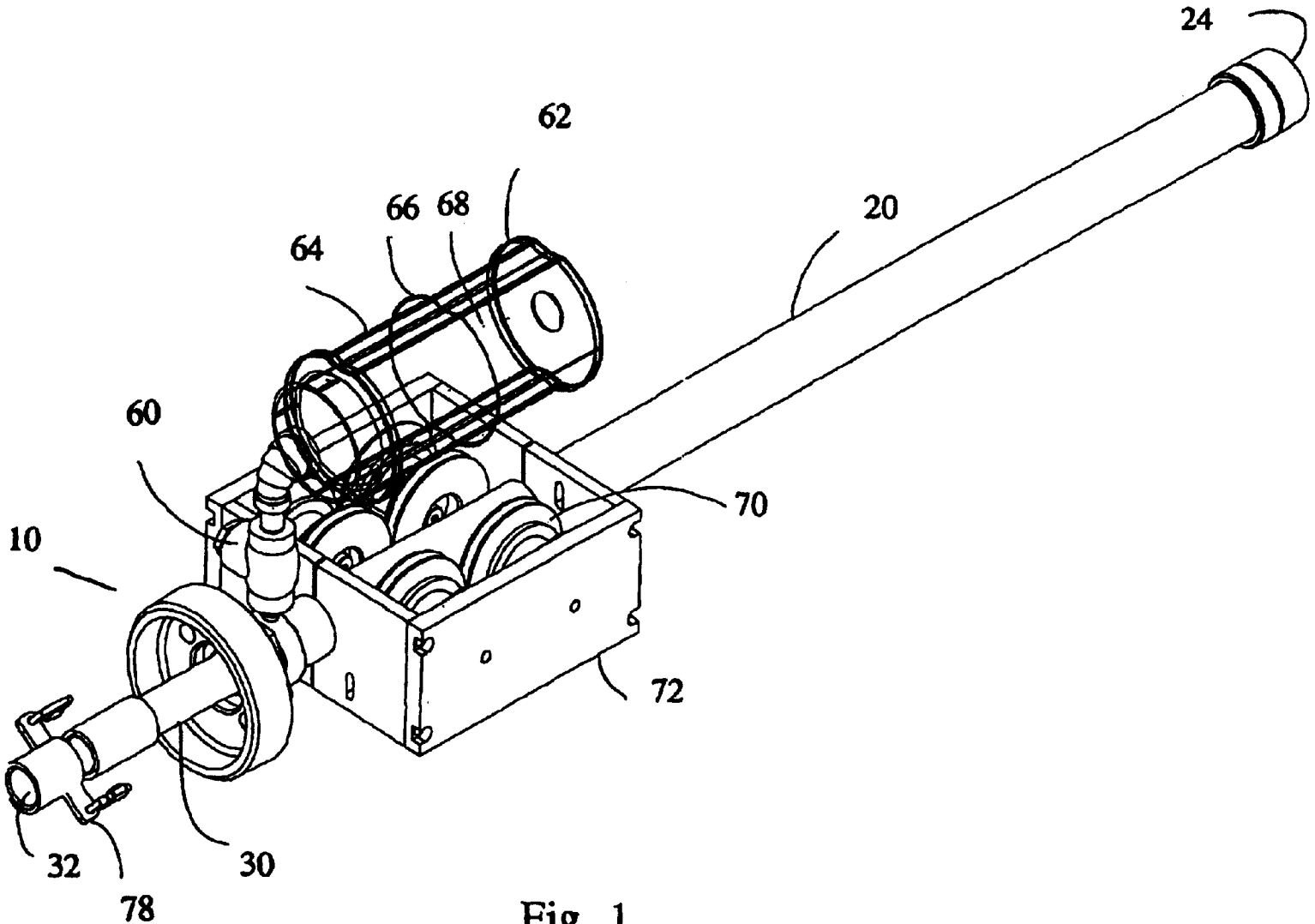
FIG. 1 is a perspective view of one illustrative embodiment of a retractable telescoping sprinkler showing the sprinkler in the retracted position.
Figure 2:
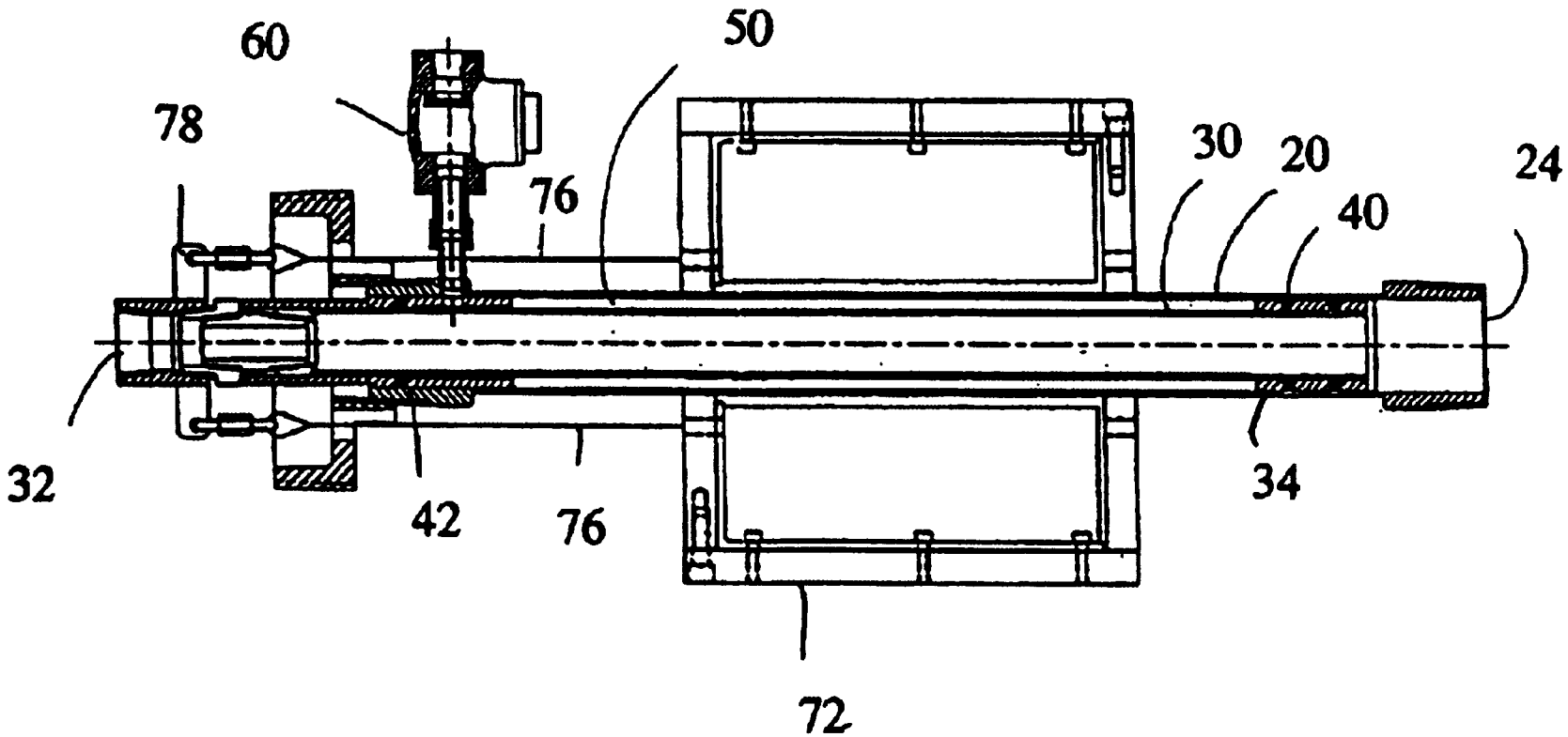
FIG. 2 is a cross-sectional view of an illustrative embodiment of a retractable telescoping sprinkler the retracted position.
Figure 3:
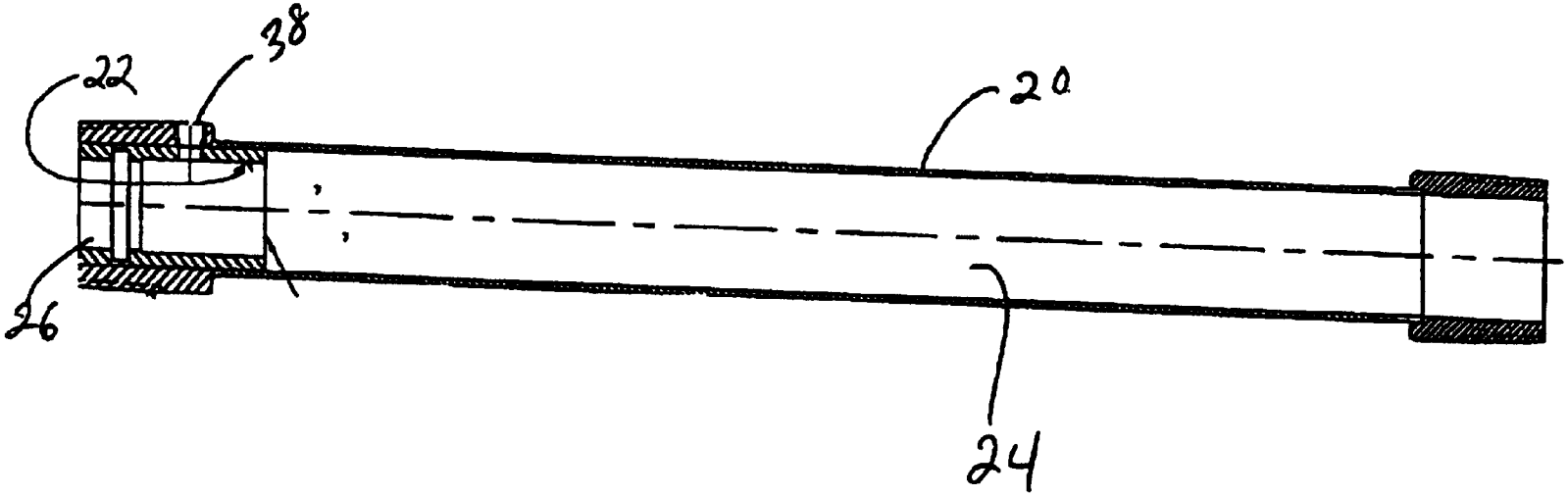
FIG. 3 is a cross section view of an outer conduit of an illustrative embodiment of a telescoping retractable sprinkler.
Figure 4:
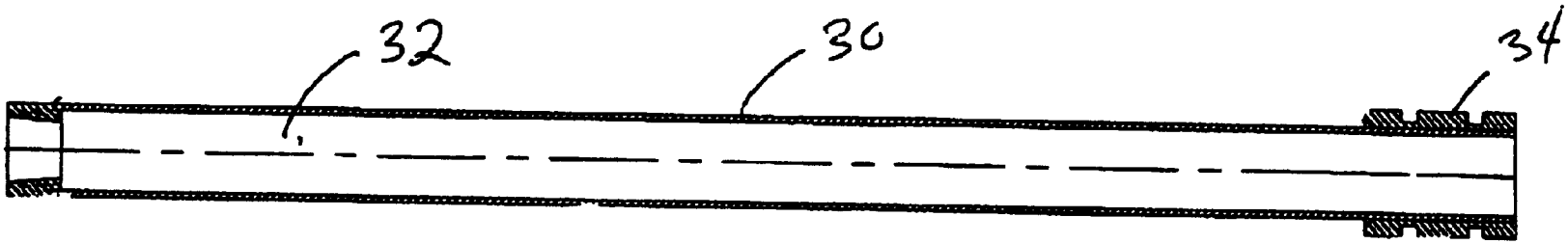
FIG. 4 is a cross section view of an inner conduit.
Figure 5:
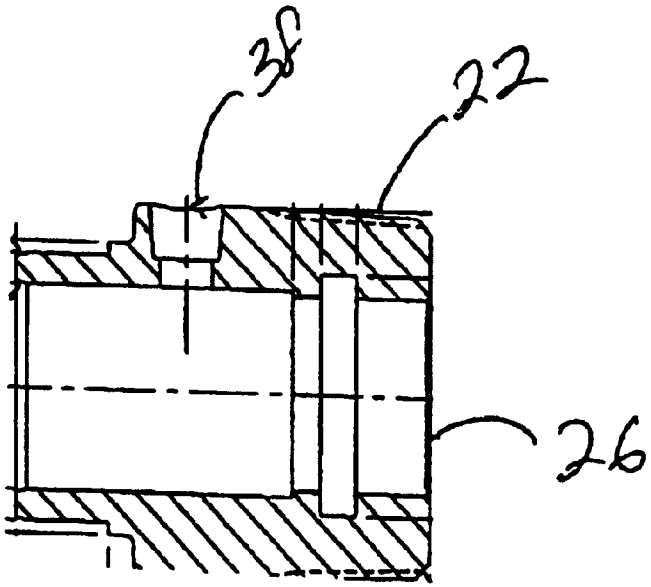
FIG. 5 is a cross sectional view of a stop for an outer conduit.
Figure 6:
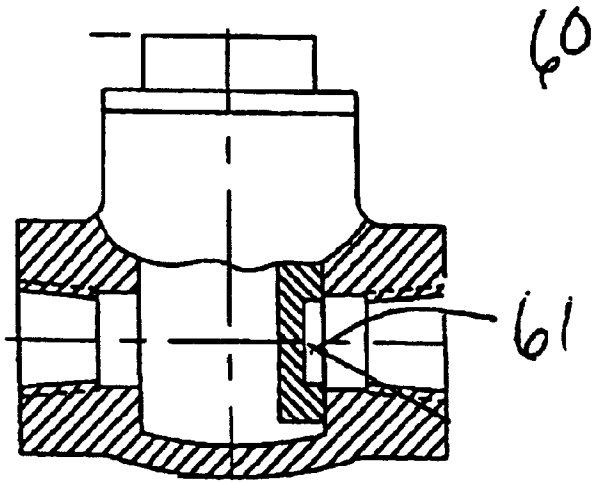
FIG. 6 is a cross sectional view of a control valve.

In FIG. 1, a retractable telescoping sprinkler is shown in the retracted position. The sprinkler 10 includes an outer conduit 20. The outer conduit 20 defines an inner channel 24 that is fluidly connected to an array of pipes capable of supplying fire-extinguishing medium to the sprinkler. The outer conduit 20 is formed from a material suitable for use in an automatic sprinkler system. Such materials are well known to those skilled in the art, and any material suitable for the installation may be used. Examples of materials that may be used include stainless steel, steel, copper, chlorinated polyvinyl chloride, and polybutylene. The channel 24 in outer conduit 20 should be sized to allow inner conduit 30 to slide longitudinally within channel 24. The outer conduit includes fitting adapted to be connected to a supply of fire extinguishing agent at one end and a stop 22 at one end. This stop is composed of a fire resistant material and is securely attached to the outer conduit. The stop can be a weldment, a threaded bushing, or secured by any means that will form a secure attachment between stop 22 and the outer conduit 20.

The sprinkler 10 includes an inner conduit 30. The inner conduit is sized such that it can move longitudinally within the channel 24 of outer conduit 20. The inner conduit is formed from materials suitable for use in an automatic fire sprinkler system and compatible with the materials used in the outer conduit and the particular characteristics of the installation. Inner conduit 30 defines an inner channel 32 that is fluidly connected to the channel 24 of the outer conduit. Inner conduits 30 is of a size sufficient flow of fire extinguishing medium to the sprinkler head at operating pressures. Inner conduit 30 includes a stop 34 at one end. The stop 34 extends axially from the outer walls of the inner conduit 34 toward the inner walls of the outer conduit. Inner conduit 30 also includes an opening at the other end. This opening is adapted to connect to a sprinkler head, or other fluid connector.

The stop 22 of the outer conduit defines an opening 26 such that the inner conduit may slide longitudinally through said passage 26, but stop 34 will but against stop 22, or a sleeve 31, in the extended position preventing the inner conduit 30 from sliding out of the outer conduit 20 when the sprinkler is extended. Inner conduit 30 acts as a piston within outer conduit 20. Outer conduit 20 serves as a cylinder for inner conduit 30. In one embodiment, stop 22 of the outer conduit 20 is a nipple formed from 300 series stainless steel. The nipple defines a central opening having a diameter of slightly larger than the outer diameter of the inner conduit. One end of the nipple is adapted to be secured to the outer conduit. A channel 38 is provided through nipple 22. The channel 38 can conveniently be threaded to receive the flow control valve. A groove can be machined on the inner wall of the nipple below the to accept an O-ring.

A sleeve 31 may be disposed within the space between inner conduit 30 and outer conduit 20, sealingly engaging the surfaces of the conduit. Optionally, the sleeve may be positioned proximate stop 22. An additional sleeve may be used as a journal bearing on the inner conduit 30. The sleeve may be made of any suitable material. Vespel® polyimide, a product of DuPont has been used.

Inner conduit 30 has is positioned such that stop 34 is positioned within the channel of the outer conduit 20 and the length of inner conduit 30 extends through the opening 26 in stop 22. The inner conduit 30 can be of any convenient length to permit the sprinkler head to come into proper position when telescoped. The outer conduit 20 has a length that permits the inner conduit 30 to retract into the chamber of the outer conduit.

Sealing means 40, 42 are located to define a chamber 50 between the inner conduit 30 and the outer conduit 20. If outer conduit 20 and inner conduit 30 are tubes, chamber 50 is annular. The seals slidably engage the walls of the conduits and define a closed volume. One seal means 40 is positioned near stop 22 of inner conduit 30. Another seal means 42 is positioned proximate around the periphery of inner conduit 30 proximate stop 34. These seals may conveniently be O-rings. A plurality of O-rings may be used at each end of the chamber. O-rings of any material may be used. Runa-N, Viton, and neoprene O-rings have been used.

The inner walls of outer conduit 20, the outer walls of inner conduit 30, and the sealing means 40 and 42 define chamber 50. When the inner conduit 30 is nested in the outer conduit 20, chamber 50 has defined volume Seal 40 engages the outer periphery of the inner conduit 30 and the inner surface of outer conduit 20. As the inner conduit 30 extends, Seal 40 slides along the inner surface of outer conduit 20 and seal 42 engages the periphery of inner conduit 30 as it slides out of the outer conduit.

Chamber 50 can be fluidly connected to a flow control valve 60 through opening 38. Opening 38 is a threaded opening in the wall of outer conduit 20 or through the side of stop. Valve 60 is in fluid communication with the space 24. The valve permits fluid to flow out of chamber 50 at a rate that can be adjusted by an operator. Additionally valve 24 permits fluid to flow into the chamber 50. By varying the size of the orifice 61 in the valve in combination with the liquid in the chamber 24. Any fluid can be used in the chamber. Preferably the fluid is an incompressible liquid. Solutions of water and glycerine, containing from about 0.01 to about 80 percent glycerine (by volume) have been useful. An orifice with a diameter of ⅛ inch, used with a 50% glycerine in water solution resulted in retraction times of about 10 seconds.

Flow control valve 60 can be fluidly connected to reservoir 64. One reservoir 64 may be connected to one or many fluid control valves. Reservoir 64 should have a sufficient capacity to hold the volume of fluid in all chamber 50 to which it is fluidly connected. Reservoir 64 may be a fluid expansion tank such as the type commonly used in recirculating hot water systems. Such a system may include a diaphragm 66 defining two chambers 62, 68 within the reservoir. The first chamber 62 is fluidly connected to the flow control valve 60. The second chamber 68 is separated from the first chamber by a flexible membrane 66 and contains a gas under some pressure. The second chamber may be connected to a vent or gas under pressure.

One embodiment of the sprinkler includes a one or more springs 70 secured to anchoring brackets 72. The anchoring brackets may be mounted on outer conduit 20. Springs 70 can be mechanically connected to a bracket 78 attached proximate the distal end of inner conduit 30. The bracket 78 can be conveniently attached to a modified coupling that couples the inner conduit 30 to the sprinkler head. Advantageously, the coupling will be above the deflector of the sprinkler head, and will not interfere with the distribution of water from the sprinkler. The spring can be balanced to maintain inner conduit 30 in a retracted position. Two springs may be used to provide approximately equal tension on both sides of the inner conduit to ensure that the tension of the springs is evenly applied. The springs 70 are preferably torsion springs. One way the springs can be connected to the distal end of the inner conduit 30 is by a cable 76 of appropriate mechanical strength and temperature resistance. Because in use cable 76 may be exposed to fire conditions, it should be made from materials that meet applicable standards for the fire hazard in the area where the sprinkler is deployed.

In operation, the retractable telescoping sprinklers are positioned in an array such that the spry pattern from the sprinkler heads when one or more sprinkler heads are activated will deliver the required distribution of fire extinguishing media to the area being protected. In an anechoic echo chamber, typical spacing might be one sprinkler head for each 90 feet of floor area. Depending on the fire hazard, the sprinklers could be positioned to with higher or lower densities as is understood in the art.

Depending upon the fire hazard of the area being protected, the ceiling height, and other factors known to those skilled in the art, a fire sprinkler system is sized to deliver a specified density of water delivery. In areas of light hazard, a flow density of from about 0.1 to about 0.2 gallons of water/square foot/minute may be adequate. In areas with higher fire hazards, higher flow rates of from about 0.2 to about 2.0 gallons/square foot/minute may be specified. Sprinkler heads with different distribution patterns and coverage areas may be used. If necessary, a shield to protect a sprinkler head from spray from an adjacent sprinkler head may be used. Water supply static pressure, flow, and residual pressure must be considered when sizing the sprinkler system. Of course following known guidelines for sprinkler system placement, sprinklers when deployed should have an unobstructed spray pattern. Positioning the top surface of the deflector between about 4 and about 12 inches lower than any obstruction to the spray pattern generally provides acceptable water distribution. For example, systems with a static pressure of about 90 psi, and a residual pressure of about 50 psi at a flow of about 100 gpm can adequately supply a retractable sprinkler system for an area rated for NFPA ordinary hazard of about 3000 sq. ft.

When the system is installed, the each retractable, telescoping sprinkler is connected to a matrix of supply pipes. The pipes are connected to a preaction valve and a control system. The control system includes smoke detectors, heat detectors, manual pull stations, and valves, switches, indicators, annunciators, alarms, and controls. One typical system is sold under the trade name Pyrotronics System XL 3. Each telescoping retracting sprinkler is installed in its retracted position. A suitable cover can be placed over the mounting flange to conceal the sprinkler. When a fire condition is detected, or in response to manual pull station or test signal, the preaction valve opens and water or an appropriate fire fighting media flows into the matrix of supply pipes. The water entering the pipes has a pressure that exerts a force on the inner conduit 30 pressing the inner conduit 30 to extend to the deployed position. When the inner conduit is extending, the fluid contained in space 24 between inner conduit 30 and outer conduit 20 flows through control valve 60 into reservoir 62. While inner conduit is extending, cables 76 attached to brackets 78 are in tension. As the cables are pulled, springs 70 apply a force to prevent the retractable sprinkler from slamming into the extended position. When the sprinkler system is full, and the retractable sprinklers have reached their stable extended positions, the pressure in the system returns to the static pressure. In a fire condition, one or more of the sprinkler heads may open in response to an elevated temperature. When the sprinkler is discharging, the residual pressure of the water supply is preferable sufficient to keep the sprinklers in a fully extended position.

When the water supply to the sprinklers is interrupted, the springs 70 attached to the brackets 78 by cables 76 retract and pull the inner conduit 30 sprinkler back to the retracted position within outer conduit 20. When the inner conduit retracts, fluid flows from reservoir 62 through control valve 60 into the space 24 between the inner conduit 30 and the outer conduit 20.

What is claimed is:

1. A retracting telescoping fire sprinkler comprising:

an outer conduit adapted to contain an inner conduit, said outer conduit having a wall and defining a passage and including at least one opening in the wall proximate a first end of said outer conduit;

an inner conduit, adapted to move in and out of said outer conduit;

a first stop affixed to said first end to said outer conduit, proximate said at least one opening in said wall, said first stop defining a passage for said inner conduit;

a second stop, affixed to one end of said inner conduit, said second stop adapted to engage said first stop when the retracting telescoping fire sprinkler is extended;

a first seal affixed to an inner surface of said outer conduit between said inner conduit and said outer conduit proximate said first stop;

a second seal affixed to an outer surface of said inner conduit between said inner conduit and said outer conduit proximate said second stop;

said inner and outer conduits and said first and second seals defining a space in fluid communication with said at least one opening in the outer conduit wall;

a flow control valve in fluid communication with said at least one opening in the outer conduit wall;

a reservoir in fluid communication with said flow control valve; and at least one spring adapted to apply tension to said inner conduit, wherein when said fire sprinkler is activated, a supply of pressurized fire extinguishing media exerts a force on said inner conduit to extend said inner conduit from said outer conduit, whereby said flow control valve controls the flow of a fluid between said space and said reservoir when said inner conduit is extending from said outer conduit, and wherein said at least one spring is adapted to retract said inner conduit back into a retracted position within said outer conduit, when said supply of pressurized fire extinguishing media is interrupted.

*2. The sprinkler of claim 1 wherein the inner surface of said outer conduit includes a first groove and said first seal disposed within the first groove.*

*3. The sprinkler of claim 2 wherein the first seal is exposed beyond the first groove so that the first seal engages the outer surface of said inner conduit.*

*4. The sprinkler of claim 1 wherein the outer surface of said inner conduit includes a second groove and said second seal disposed within the second groove.*

*5. The sprinkler of claim 4 wherein the second seal is exposed beyond the second groove so that the second seal engages the inner surface of said outer conduit.*

*6. The sprinkler of claim 1 wherein the first seal includes an engagement portion for engaging the outer surface of said inner conduit and the engagement portion disposed between the inner conduit and outer conduit.*

*7. The sprinkler of claim 1 wherein the second seal includes an engagement portion for engaging the inner surface of said outer conduit and the engagement portion disposed between the inner conduit and outer conduit.*

*8. The sprinkler head of claim 1 wherein the outer conduit includes a collar and the first seal is disposed adjacent to the collar.*

*9. The sprinkler head of claim 1 wherein the inner conduit includes a collar and the second seal is disposed adjacent to the collar.*

*10. The sprinkler of claim 1 wherein said inner conduit includes a head and the fire extinguishing media exerts a force on the head in order to extend said inner conduit from said outer conduit.*

*11. The sprinkler of claim 1 wherein the first stop includes a nipple formed by a first annular rim formed within said outer conduit.*

*12. The sprinkler of claim 11 wherein the passage of the first stop is formed by a first bore defined by the first annular rim.*

*13. The sprinkler of claim 1 wherein the second stop includes a nipple formed by a second annular rim.*

*14. The sprinkler of claim 1 wherein the flow control valve includes a gate having an orifice formed therein and the orifice for controlling the flow of the media into the reservoir.*

*15. The sprinkler of claim 1 wherein the media is a glycerine-water mixture and the opening has a predetermined diameter in order to result in media retraction times of about 16 seconds.*

*16. A retracting telescoping fire sprinkler comprising:*

*an outer conduit adapted to contain an inner conduit, said outer conduit having a wall and defining a passage and including at least one opening in the wall proximate a first end of said outer conduit;*

*an inner conduit, adapted to move in and out of said outer conduit;*

*a first stop disposed at said first end of said outer conduit;*

*a second stop disposed at one end of said inner conduit, said second stop adapted to engage said first stop when the retracting telescoping fire sprinkler is extended;*

*a first seal affixed to an inner surface of said outer conduit;*

*a second seal affixed to an outer surface of said inner conduit; said inner and outer conduits and said first and second seals defining a space in fluid communication with said at least one opening in the outer conduit wall;*

*a flow control valve in fluid communication with said at least one opening in the outer conduit wall;*

*a reservoir in fluid communication with said flow control valve; and*

*said fire sprinkler is activated, a supply of pressurized fire extinguishing media exerts a force generally on said inner conduit to extend said inner conduit from said outer conduit, whereby said flow control valve controls the flow of a fluid between said space and said reservoir when said inner conduit is extending from said outer conduit, and wherein said at least one spring is adapted to retract said inner conduit back into a retracted position within said outer conduit, when said supply of pressurized fire extinguishing media is interrupted.*

*17. The sprinkler of claim 16 wherein the inner surface of said outer conduit includes a first groove and said first seal disposed within the first groove.*

*18. The sprinkler of claim 16 wherein the outer surface of said inner conduit includes a second groove and said second seal disposed within the second groove.*

*19. The sprinkler of claim 16 wherein the outer conduit includes a collar and the first seal is disposed adjacent to the collar.*

*20. The sprinkler of claim 16 wherein the inner conduit includes a collar and the second seal is disposed adjacent to the collar.*

*21. The sprinkler of claim 16 wherein said inner conduit includes a head and the fire extinguishing media exerts a force on the head in order to extend said inner conduit from said outer conduit.*

*22. The sprinkler of claim 16 wherein the first stop includes a nipple formed by a first annular rim formed within said outer conduit.*

*23. The sprinkler of claim 22 wherein the passage of the first stop is formed by a first bore defined by the first annular rim.*

*24. The sprinkler of claim 16 wherein the second stop includes a nipple formed by a second annular rim.*

*25. The sprinkler of claim 16 wherein the flow control valve includes a gate having an orifice formed therein and the orifice for controlling the flow of the media into the reservoir.*

*26. The sprinkler of claim 16 wherein the media is a glycerine-water mixture and the opening has a predetermined diameter in order to result in media retraction times of about 16 seconds.*

*27. The sprinkler of claim 16 wherein a pair of springs act to retract said inner conduit back into a retracted position within said outer conduit following activation of the sprinkler by the media.*

*28. A retracting telescoping fire sprinkler comprising:*

*an outer conduit adapted to contain an inner conduit, said outer conduit having a stop disposed at one end, said stop defining a passage;*

*an inner conduit adapted to move into and out of said passage of said outer conduit;*

*said outer conduit and said inner conduit defining a space therebetween;*

*a first seal disposed at least partly in said space between said inner conduit and said outer conduit;*

*a second seal disposed at least partly in said space between said inner conduit and said outer conduit;*

*a flow controlling valve in fluid communication with said space;*

*a reservoir in fluid communication with said flow controlling valve that adjusts the rate of flow from said space to said reservoir; and*

*at least one spring adapted to apply tension to said inner conduit.*

*29. The sprinkler of claim 28 wherein the flow controlling valve includes a gate having an orifice formed therein and the orifice for controlling the flow into the reservoir.*

*30. The sprinkler of claim 28 wherein the adjustment to the flow controlling valve is provided by a preaction signal in response to a manual pull station or test signal.*

* * * * *